(12) United States Patent
Takahashi

(10) Patent No.: US 6,473,380 B1
(45) Date of Patent: Oct. 29, 2002

(54) INFORMATION RECORDING AND REPRODUCING APPARATUS FOR FORMATTING A REWRITABLE RECORDING MEDIUM BY AN EASY FORMATTING METHOD

(75) Inventor: Naoto Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/387,830

(22) Filed: Sep. 1, 1999

(30) Foreign Application Priority Data

Sep. 3, 1998 (JP) .......................... 10-250146
Nov. 5, 1998 (JP) .......................... 10-315049

(51) Int. Cl.$^7$ .............................................. G11B 7/00
(52) U.S. Cl. .............................. 369/59.25; 369/124.08
(58) Field of Search .................... 369/124.06, 124.7, 369/124.08, 59.25; 360/48, 53, 72.2, 77.08

(56) References Cited

U.S. PATENT DOCUMENTS

| | | | | |
|---|---|---|---|---|
| 5,450,384 A | * | 9/1995 | Dahman et al. ............... 360/30 |
| 5,592,348 A | * | 1/1997 | Strang, Jr. ............... 360/78.01 |
| 5,721,856 A | * | 2/1998 | Takeuchi ..................... 369/58 |
| 5,745,459 A | * | 4/1998 | Inokuchi et al. ......... 369/53.21 |
| 5,862,123 A | * | 1/1999 | Horie et al. ............. 369/275.4 |
| 6,134,204 A | * | 10/2000 | Tasugher ..................... 369/59 |
| 6,233,105 B1 | * | 5/2001 | Chen et al. ................... 360/48 |

FOREIGN PATENT DOCUMENTS

JP            9-288883         11/1997

* cited by examiner

Primary Examiner—Nabil Hindi
(74) Attorney, Agent, or Firm—Dickstein Shapiro Morin & Oshinsky LLP (57) ABSTRACT

An information recording and reproducing apparatus can reduce a time spent on an initial formatting operation performed on a rewritable recording medium such as a CD-RW disk. The rewritable recording medium has a user data area. A track containing a plurality of packets is defined in the user data area by being subjected to an initial formatting process before use so that data is recorded in the user data area on an individual packet basis. A blank, rewritable recording medium is formatted without formatting the user data area so that only information regarding the track is recorded on the recording medium in accordance with the initial formatting process. Time information previously recorded on the rewritable recording medium is read so that recording operation on the user data area is performed by referring to the time information.

5 Claims, 8 Drawing Sheets

INFORMATION RECORDING AND REPRODUCING APPARATUS FOR FORMATTING A REWRITABLE RECORDING MEDIUM BY AN EASY FORMATTING METHOD

BACKGROUND OF THE INVENTION

1. Field of the Invention

The present invention generally relates to an information recording and reproducing apparatus and, more particularly, to an information recording and reproducing apparatus which records information on an optical disk such as a CD-R or a CD-RW after formatting the optical disk.

2. Description of the Related Art

Conventionally, there is an optical disk recording apparatus which manages a blank packet in a track on an optical disk so as to quickly seek for the blank packet so that a recording time or a reproducing time is reduced when a packet recording or reproducing is performed on the optical disk. Such an optical disk recording apparatus is disclosed in Japanese Laid-Open Patent Application No.9-288883.

Recently, a recordable compact disk (CD-R) and a rewritable compact disk (CD-RW) have become popular as a compact disk on which information or data can be recorded by a user. In the CD-R disk system, recording can be performed only once on the same recording area. In the CD-RW system, recording can be performed many times on the same recording area by overwriting.

Each of the CD-R disk and the CD-RW disk has an absolute time in pre-groove (ATIP). The ATIP is a groove formed on a recording surface of the disk so that time information and disk information is recorded by a so-called wobble of the groove in accordance with an ATIP format.

When a recording or reproducing operation is performed on a CD-R disk or a CD-RW disk, a reading position or a writing position can be detected by the time information, and an intensity of laser beam for recording can be determined by the disk information.

A minimum unit of information reproduceable from the CD-R disk or the CD-RW disk is referred to as a block. A single block can contain an amount of information corresponding to 2,048 to 2,352 bytes.

A minimum unit of information to be recorded on the CD-R disk or the CD-RW disk is referred to as a packet. A single packet includes at least one user data block which stores information to be reproduced. The single packet also includes five link blocks preceding the user data block and two link blocks (run-out blocks) following the user data block. The five link blocks consist of one link block and four run-in blocks. A number of user data blocks in a single packet is referred to as a packet length.

As a method for recording information or data on the CD-R disk or the CD-RW disk, there is a track-at-once method and a packet write method.

According to the track-at-once method, a single track is recorded all at once by a single packet. At most 99 tracks can be recorded by a single packet. Information regarding a start address and an end address of a track is recorded in a separate area on the disk such as a program memory area (PMA) or a table of contents (TOC). A pre-gap consisting of 150 blocks or 225 blocks is provided in front of each track so that attribute information regarding a track such as a packet length of a fixed track is recorded in a user data field provided in the pre-gap.

On the other hand, according to the packet write method, a track is divided into a plurality of packets so that a recording is performed on an individual packet basis. There are a fixed packet write method and a variable packet write method. In the fixed packet write method, a packet length is fixed to a predetermined value. In the variable packet write method, a packet length is variable.

A universal disk format (UDF) is one of the file systems using the fixed packet write method. The UDF is a file system in which recording, reproducing or erasing of data can be performed. The UDF is also referred to as a random UDF since the UDF can record, reproduce or erase information randomly on an individual packet basis. In the UDF, in order to enable such a random access to the CD-RW disk, a disk must be formatted before use.

In the formatting operation, an entire recording area or a designated recording area of the CD-RW disk is filled by fixed packets. By performing the formatting operation, a recording, reproducing or erasing operation can be performed on an arbitrary recording area of the CD-RW disk.

However, the above-mentioned formatting operation has a problem in that a formatting operation takes a long time to fill the fixed packets in the entire recording area or the designated recording area. The recording capacity of the standard CD-RW disk is 650 Megabytes which corresponds to 74 minutes in recording time. Accordingly, in order to format an entire recording area of the CD-RW disk including recording of the TOC information, it takes about 40 minutes to format the CD-RW disk even when the formatting operation is performed at a double speed.

As mentioned above, according to the UDF, a recording, reproducing or erasing operation can be performed on an arbitrary area of the CD-RW disk after the CD-RW disk is formatted. However, when a user uses a blank disk which is an unformatted disk, the user must wait for about 40 minutes to start recording.

SUMMARY OF THE INVENTION

It is a general object of the present invention to provide an improved and useful information recording and reproducing apparatus in which the above-mentioned problems are eliminated.

A more specific object of the present invention is to provide an information recording and reproducing apparatus which can reduce a time spent on an initial formatting operation performed on a rewritable recording medium such as a CD-RW disk.

In order to achieve the above-mentioned objects, there is provided according to one aspect of the present invention an information recording and reproducing apparatus using a rewritable recording medium having a user data area, a track containing a plurality of packets is defined in the user data area by being subjected to an initial formatting process before use so that data is recorded in the user data area on an individual packet basis, the information recording and reproducing apparatus comprising:

easy formatting means for formatting a blank, rewritable recording medium without formatting the user data area so that only information regarding the track is recorded on the recording medium in accordance with the initial formatting process; and position reading means for reading time information previously recorded on the rewritable recording medium, the time information representing position information in the user data area so that recording operation on the user data area is performed by referring to the time information.

According to the present invention, the user data area is not formatted when the initial formatting operation is performed. Since a time spent on the formatting operation performed on the user data area occupies a large part of a time spent on the initial formatting operation, the time spent on the formatting operation can be greatly reduced. A normal recording can be performed by determining a recording position on the rewritable recording medium by referring to the time information previously recorded on the blank, rewritable recording medium. Accordingly, a normal recording operation is started without formatting the user data area. Thus, when the blank, rewritable recording medium is used for recording for the first time, a user is not waited for a long time until the initial formatting operation is completed.

The information recording and reproducing apparatus according to the present invention may further comprise blank packet recording means for recording predetermined data in a blank packet contained in the user data area when the information recording and reproducing apparatus does not perform a normal recording or reproducing operation on the rewritable recording medium.

Accordingly, by recording the predetermined data in the blank packet after the initial recording is performed, the blank packet can be eliminated and the user data area is filled by recorded packets. The thus-recorded rewritable recording medium can be reproduced by a conventional reproducing apparatus such as a CD-ROM drive which determines a reproducing position by referring to position information which is recorded when data is recorded in the packets.

Additionally, the information recording and reproducing apparatus according to the present invention may further comprise a buffer storing an address of a last packet in which data is recorded, and wherein the blank packet recording means records the predetermined data in only a blank packet located on an inner side of the rewritable recording medium with respect to the address stored in the buffer.

Accordingly, the recording operation by the blank packet recording means is not performed on a blank packet which is not subjected to a reproducing operation. Thus, a time spent on the recording operation by the blank packet recording means can be reduced.

In one embodiment of the present invention, the rewritable recording medium may be a CD-RW disk, and the easy formatting means may format only a lead-in area, a program memory area and a pre-gap area of the CD-RW disk.

Additionally, there is provided according to another aspect of the present invention a method of recording a rewritable recording medium having a user data area, a track containing a plurality of packets is defined in the user data area by being subjected to an initial formatting process before use so that data is recorded in the user data area on an individual packet basis, said method comprising the steps of:

formatting a blank, rewritable recording medium without formatting the user data area so that only information regarding the track is recorded on the recording medium in accordance with the initial formatting process;

reading time information previously recorded on the blank, rewritable recording medium, the time information representing position information in the user data area;

recording data in the user data area on an individual packet basis by referring to the time information; and recording predetermined data in a blank packet contained in the user data area when a normal recording or reproducing operation is not performed on the rewritable recording medium.

Other objects, features and advantages of the present invention will become more apparent from the following detailed description when read in conjunction with the accompanying drawings.

DETAILED DESCRIPTION OF THE PREFERRED EMBODIMENTS

Figure 1:
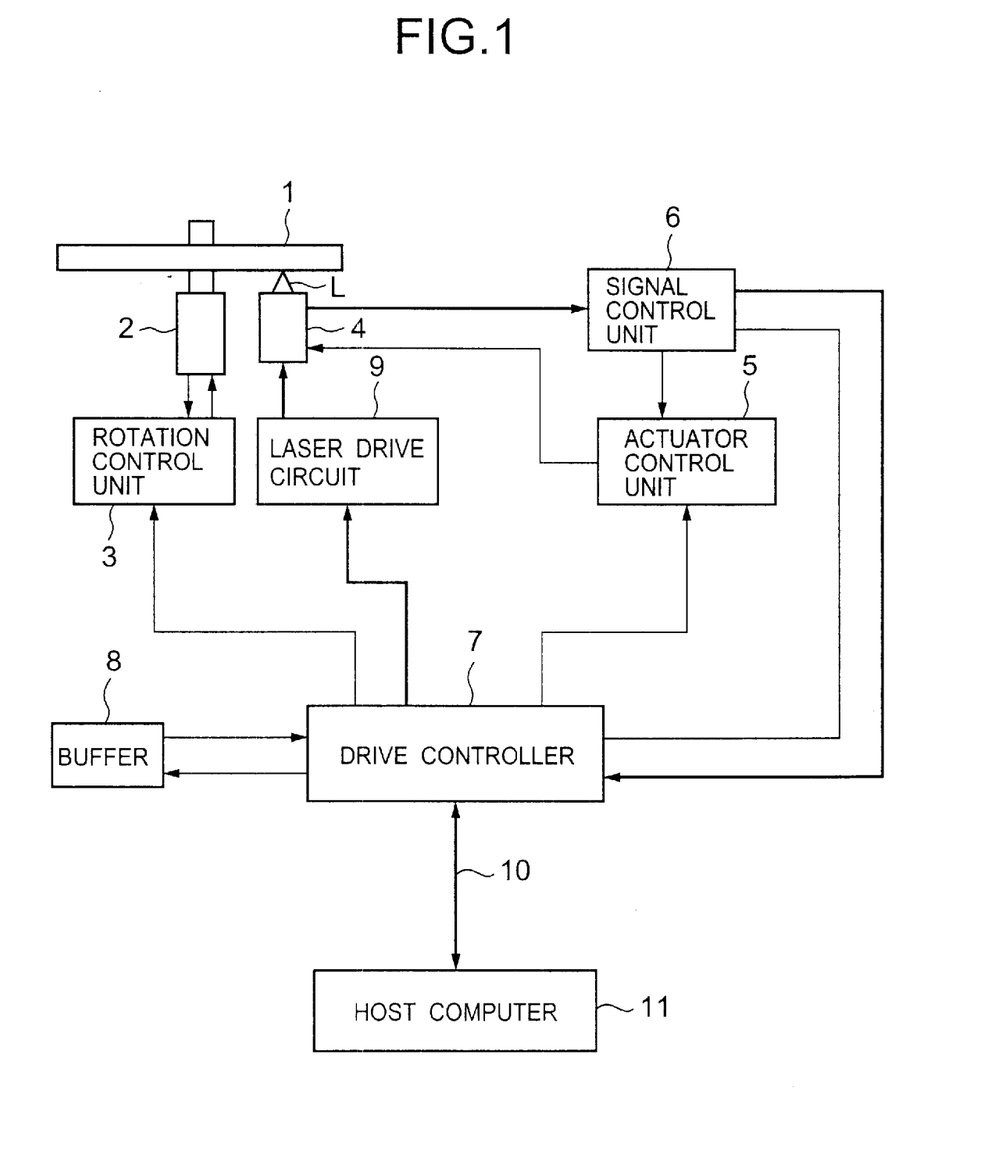
FIG. 1 is a diagram showing a structure of a CD-RW drive according to a first embodiment of the present invention.

A description will now be given, with reference to FIG. 1, of a first embodiment showing the present invention. FIG. 1 is a diagram of a structure of a CD-RW drive according to the first embodiment of the present invention.

The CD-RW drive shown in FIG. 1 comprises a motor 2 for rotating a CD-RW disk 1, which is a rewritable recording medium, at a predetermined speed. The motor 2 is controlled by a rotation control unit 3. The CD-RW drive also comprises a pickup 4, an actuator control unit 5, a signal control unit 6 and a laser drive circuit 9. The pickup 4 projects a laser beam L onto the CD-RW disk 1 being rotated by the motor. The actuator control unit 5 controls the pickup 4 to move in a radial direction of the CD-RW disk 1. The signal control unit 6 controls signals output from the pickup 4. The laser drive circuit 9 drives a laser diode so as to generate the laser beam L.

The CD-RW drive shown in FIG. 1 further comprises a drive controller 7, a buffer 8 and an external interface 10. The drive controller 7 controls operations with respect to the entire CD-RW drive, and also performs various processes relating to the present invention. The buffer 8 temporarily stores data transferred from an external host computer 11. The external interface 10 exchanges data and command signals with the host computer 11.

The drive controller 7 is constituted by a microcomputer that comprises a CPU, a ROM, a RAM, etc. The drive controller 7 controls various operations such as a recording operation, reproducing operation or a formatting operation.

Figure 2:
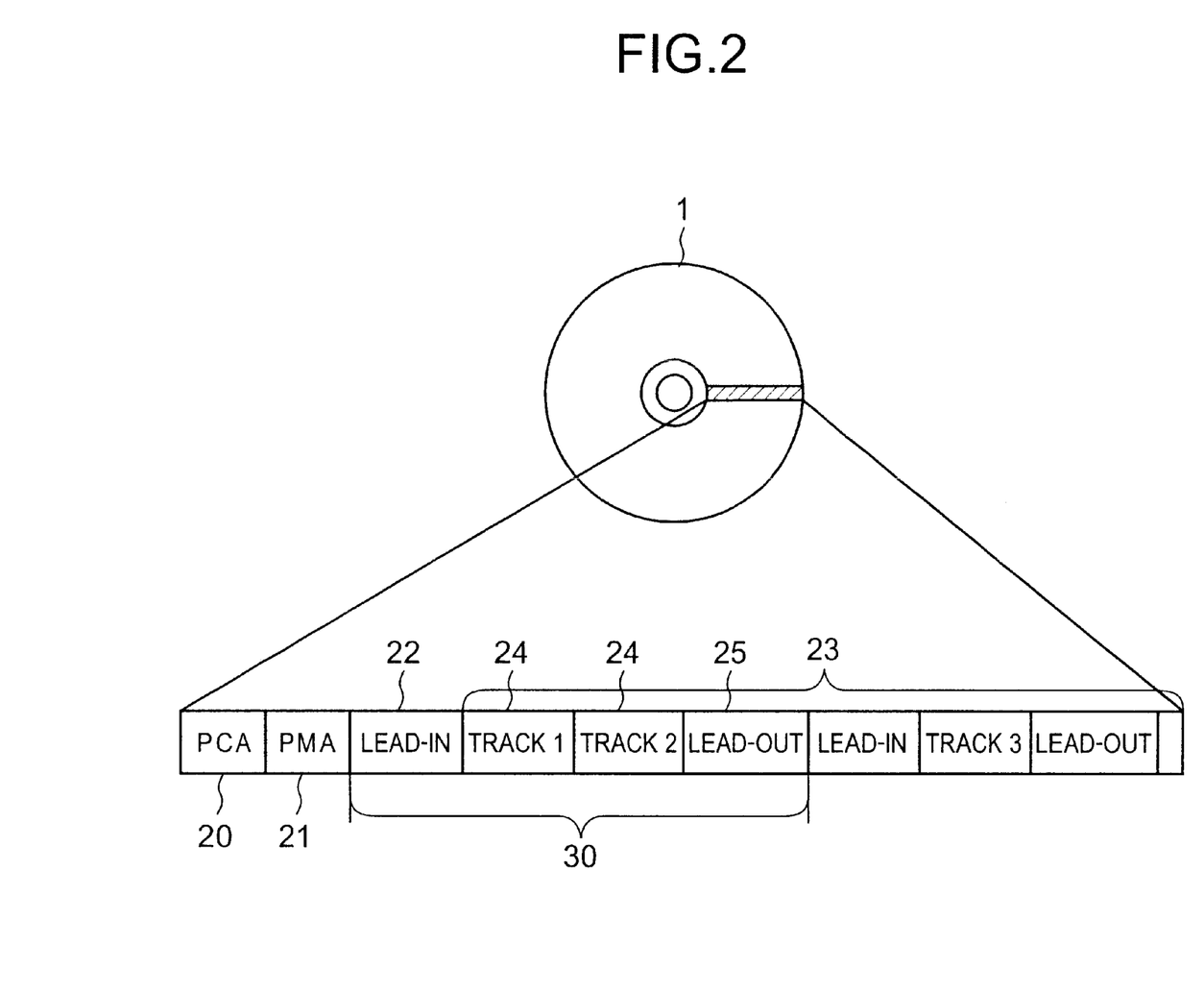
FIG. 2 is an illustration for explaining a data recording area of a CD-RW disk shown in FIG. 1.

FIG. 2 is an illustration for explaining a data recording area of the CD-RW disk 1.

The CD-RW disk 1 has a power calibration area (PCA) 20, a program memory area (PMA) 21, a lead-in area 22 and a program area 23 in that order from an inner side toward an outer side of the CD-RW disk 1.

The PCA 20 is an area on which a recording power calibration is performed when recording data on the CD-RW disk 1. The PCA 20 includes one hundred test areas and one hundred count areas. The CD-RW drive performs an optimum laser power calibration (OPC) by using the PCA 20 when data or information is recorded on the CD-RW disk 1 for the first time so as to set an optimum laser power for data recording.

The PMA 21 is an area for recording track information.

The lead-in area 22 is an area indicating the beginning of a cession 30, and track information (TOC) regarding the cession 30 is recorded in the lead-in area 22. The cession 30 is a unit comprising the lead-in area 22, at least one track 24 and a lead-out area 25. In FIG. 2, two tracks, that is, a track-1 and a track-2 are provided in the cession 30.

The program area 23 is an area in which user data is recorded. IN the program area, data is recorded on an individual track basis. Information regarding a start address and an end address of the track 24 and a data mode is recorded in the PMA 21 and the lead-in area 22 in accordance with the TOC. Information regarding the track 24 is recorded by the TOC.

The track 24 is an area in which user data such as file data or music data is recorded. The lead-out area 25 is an area indicating an end of the cession 30.

Figure 3:
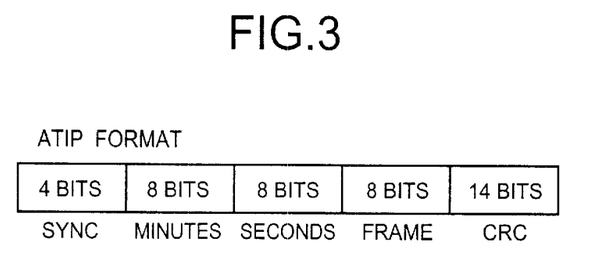
FIG. 3 is an illustration of a format of the ATIP formed on the CD-RW disk.

FIG. 3 is an illustration of a format of the ATIP formed on the CD-RW disk 1.

The ATIP is a groove formed on the CD-RW disk 1 which groove is provided with fine wobbling so as to indicate time information and disk information. In FIG. 3, "minutes" and "seconds" are represented by a sixty count cycle number system, and "Frame" is represented by a seventy-five count number system.

Figure 4:
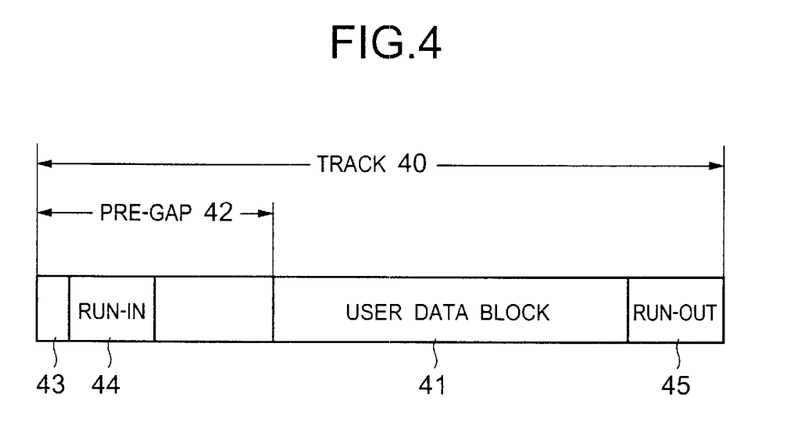
FIG. 4 is an illustration of a format of a track which is recorded in accordance with a track-at-once method.

FIG. 4 is an illustration of a format of a track which is recorded in accordance with a track-at-once method.

A track 40 is composed of a single packet. When the track-at-once method is used, a user data block area 41 must contain at least 300 blocks. A pre-gap area 42 is provided at the head of the track 40, and contains 150 blocks or 225 blocks. Attribute data regarding the track is recorded in a user data field in the pre-gap area 42.

A link block 43 comprising a single block is provided to indicated a connection between tracks. A run-in block 44 comprising four blocks indicated a head of the track 40. The user data block 41 is an area in which data is supplied by a user (the host computer 11). A run-out block 45 comprising two blocks indicated an end of the track 40.

Figure 5:
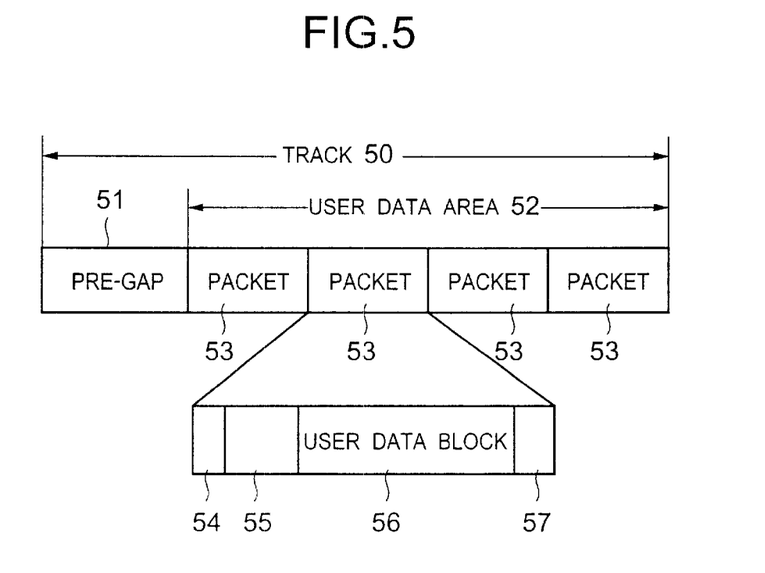
FIG. 5 is an illustration of a format of a track which is recorded in accordance with a packet write method.

FIG. 5 is an illustration of a format of a track which is recorded in accordance with a packet write method.

A track 50 recorded by the packet write method comprises a pre-gap area 51 and a user data area 52. The user data area 52 comprises a plurality of packets 53. The pre-gap area 51 has the same structure as the pre-gap are 42 shown in FIG. 4, and a description thereof will be omitted.

The packet 53 is an assemble of sectors present in the track 50. A minimum unit of the packet 53 is a single sector. According to the packet write method, the packet 53 is recorded all at once.

The link block 54 comprising a single block indicates a connection between packets. The run-in block 55 comprising four blocks indicates a head of the packet 53. The user data block 56 is an area in which data supplied by a user (the host computer 11) is recorded. The run-out block 57 comprising two blocks indicates an end of the packet 53.

The CD-RW drive records the packet 53 by a single continuous writing operation. As mentioned above, the minimum unit of writing according to the packet write method is a single block, whereas the minimum unit of writing according to the track-at-once method is a single track which contains at least 300 tracks. Accordingly, there is an advantage in the packet write method in that the CD-RW disk can be used in a manner similar to a hard disk or a floppy disk.

Figure 6:
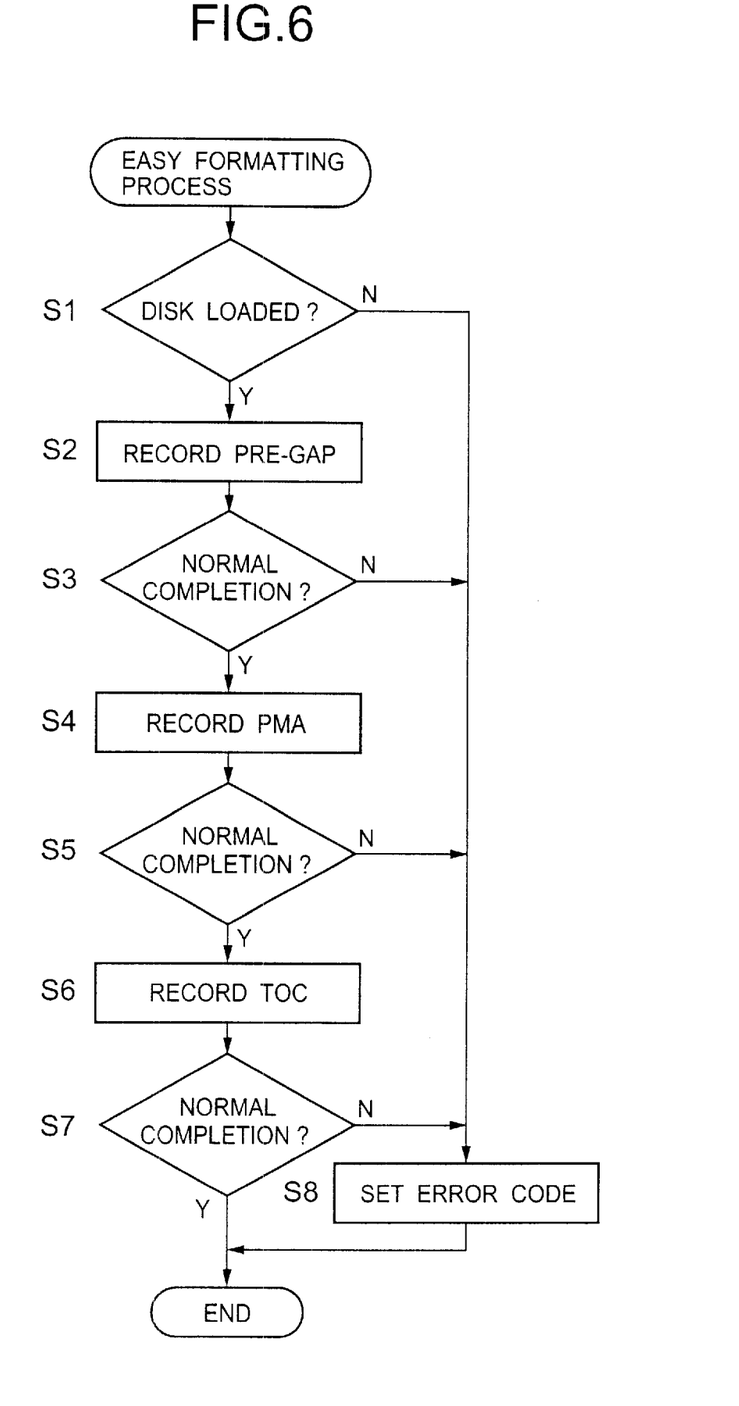
FIG. 6 is a flowchart of an easy formatting process performed on the CD-RW disk by the CD-RW drive shown in FIG. 1.

FIG. 6 is a flowchart of an easy formatting process performed on the CD-RW disk 1 by the CD-RW drive shown in FIG. 1.

The easy formatting process is started when the drive controller receives a format command from the host computer 11. The drive controller 7 determines, in step S1, whether or not the CD-RW 1 is loaded in the CD-RW drive. If it is determined that the CD-RW 1 is loaded, the routine proceeds to step S2. In step S2, the pre-gap area of the recording area of the CD-RW disk 1 is recorded.

Thereafter, it is determined, in step S3, whether or not the recording of the pre-gap area is completed normally. If it is determined that the recording of the pre-gap area is completed, the routine proceeds to step S4. In step S4, a recording is performed on the PMA area.

Thereafter, it is determined, in step S5, whether or not the recording of the PMA area is completed normally. If it is determined that the recording of the PMA area is completed normally, the routing proceeds to step S6. In step S6, a recording is performed on the TOC area, and the routine proceeds to step S7.

It is then determined, in step S7, whether or not the recording of the TOC area is completed normally. If it is determined that the recording of the TOC area is completed normally, the routine is ended.

On the other hand, if it is determined, in step S1, that the CD-RW disk 1 is not loaded in the CD-RW drive, or if it is determined, in step S3, that the recording of the pre-gap area is incomplete due to an error, or if it is determined, in step S5, that the recording of the PMA area is incomplete due to an error, the routine proceeds to step S8. In step S8, an error code is set, and the routine is ended.

In the above-mentioned easy formatting process, only the TOC area, the PMA area and the pre-gap area are recorded, and a process for filling an entire recording area or a designated recording area with fixed packets is omitted. Accordingly, a time spent on the initial formatting process is greatly reduced.

Figure 7:
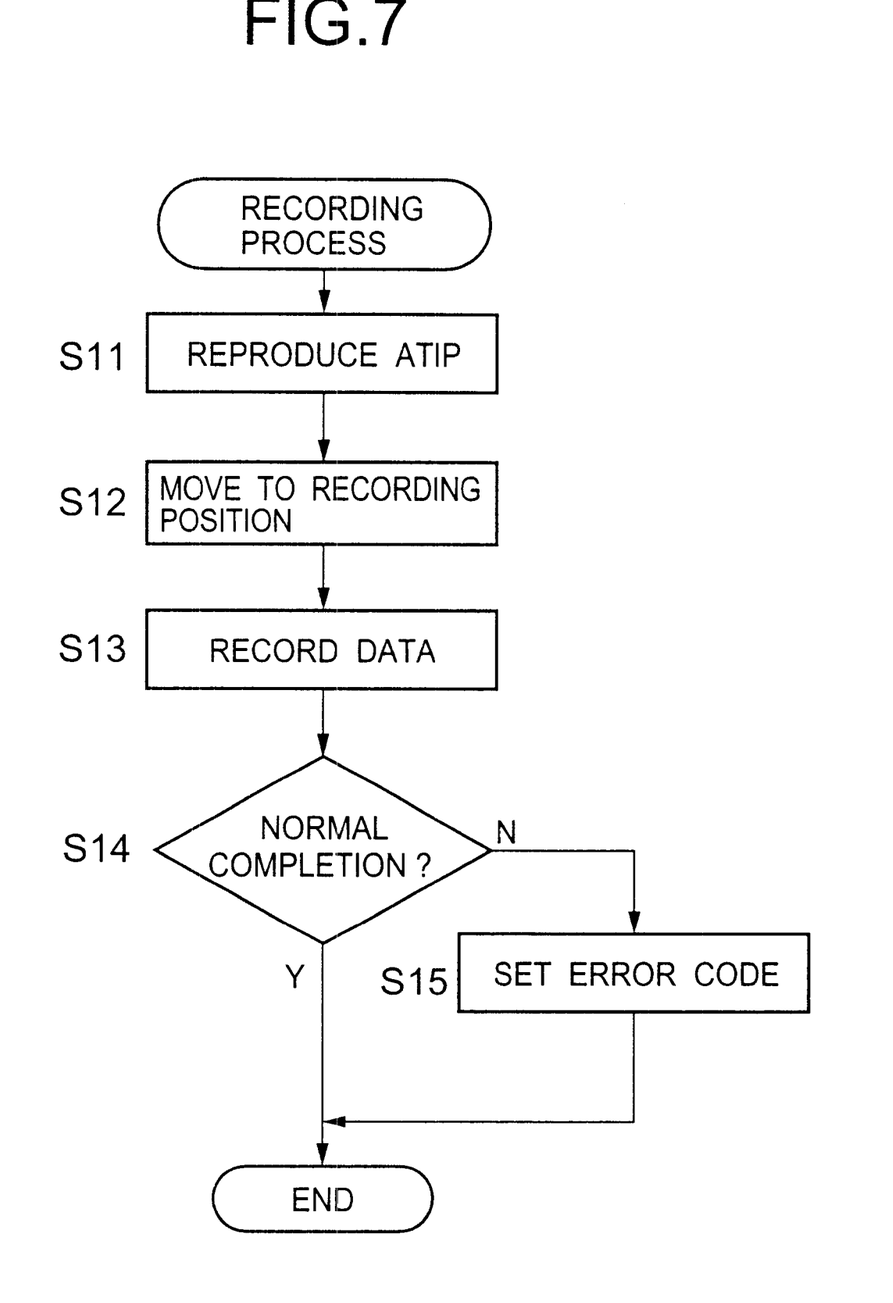
FIG. 7 is a flowchart of an operation for recording information on the CD-RW which is formatted by the easy formatting process.

FIG. 7 is a flowchart of an operation for recording information on the CD-RW 1 which is formatted by the above-mentioned easy formatting process.

Normally, when the CD-RW disk 1 is initially formatted, predetermined data is recorded in the track area so that a recording address can be detected by referring to a sub code which is also recorded together with the predetermined data. However, in the CD-RW drive according to the present embodiment, the sub code is not recorded since no data is recorded in the user data area by the initial formatting process. Accordingly, in the CD-RW drive according to the present embodiment, address information is detected by reading the ATIP similar to that performed on a blank disk.

The recording process shown in FIG. 7 is started when a recording command is received from the host computer 11. First, the drive controller reproduces, in step S11, information recorded by the ATIP. Then, in step S12, the pickup 4 is moved to a recording position on the CD-RW disk 1. In step S13, data is recorded on the CD-RW disk 1.

Thereafter, it is determined, in step S14, whether or not the recording operation in the step 13 is completed normally. If it is determined that the recording operation is completed normally, the routine proceeds is ended.

On the other hand, if it is determined, in step S14, that the recording operation of step S14 is incomplete due to an error, the routine proceeds to step S15. In step S15, an error code is set, and the routine is ended.

However, the CD-RW disk 1 formatted by the above-mentioned easy formatting process cannot be reproduced by a conventional CD-ROM drive since the conventional CD-ROM drive does not have a function to read the information provided by the ATIP. That is, the conventional CD-ROM drive cannot recognize an address in a blank area between areas in which data is recorded, and loose a reproducing position at such a blank area.

Accordingly, in order to enable the conventional CD-ROM drive to reproduce the CD-RW 1 formatted by the easy formatting process, a blank area should be eliminated from the recording area.

The CD-RW drive according to the present embodiment achieves such a function so that the CD-RW disk 1 formatted by the easy formatting process can be reproduced by a conventional CD-ROM drive. Specifically, a blank area between the recorded areas is eliminated by recording predetermined data in the blank area when the CD-RW drive is not operated by a user (the host computer 11).

Figure 8:
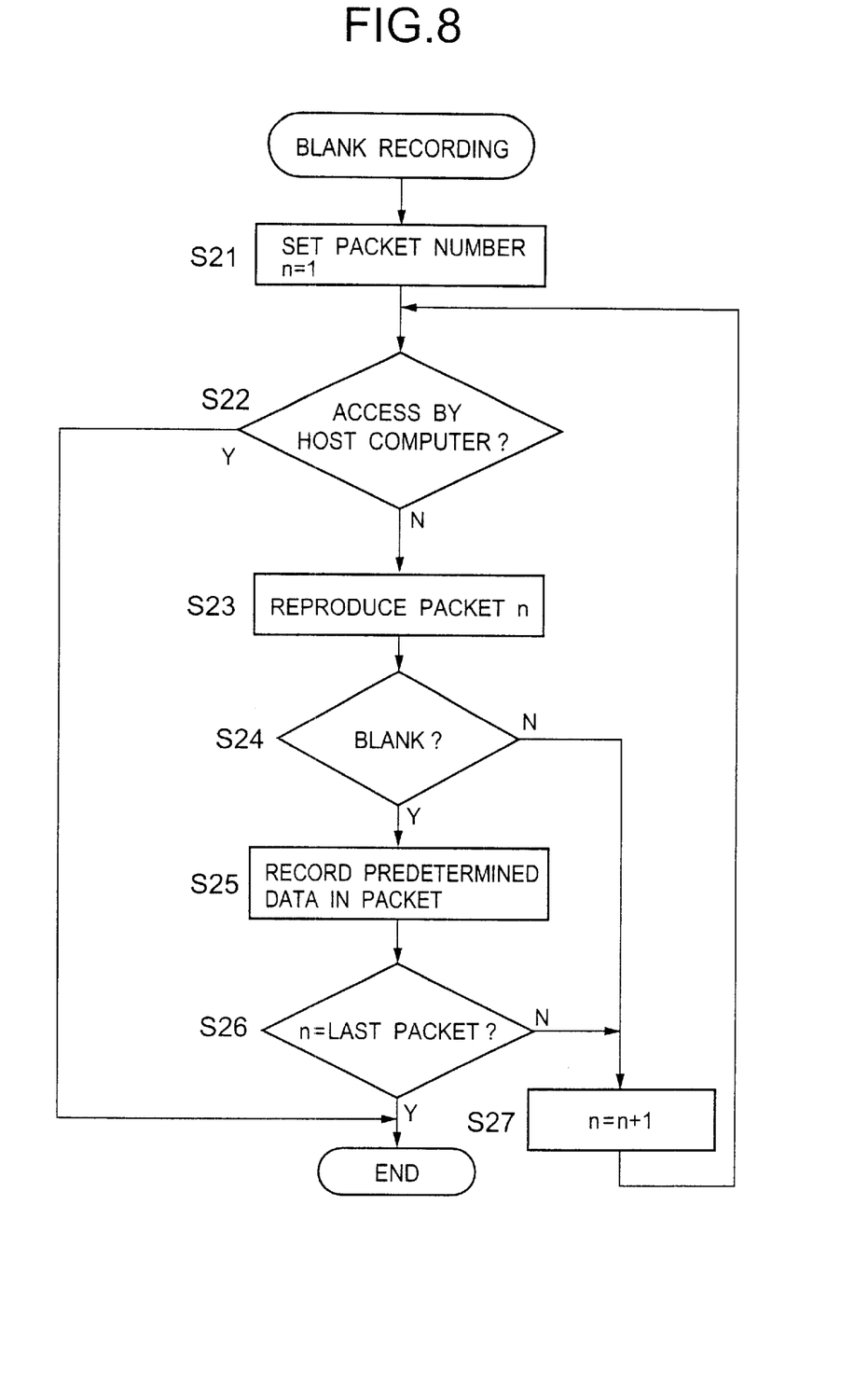
FIG. 8 is a flowchart of a blank recording process for recording data in a blank area of the CD-RW disk by the CD-RW drive shown in FIG. 1.

FIG. 8 is a flowchart of a blank recording process for recording data in a blank area of the CD-RW disk 1 by the CD-RW drive shown in FIG. 1.

A blank area can be detected by reproducing the packets recorded on the CD-RW disk 1 from the first position. When the process shown in FIG. 8 is started, the drive controller 7 sets, in step S21, a number is "1", "2", "3", . . . , so that the packet at the first position is given "1", the packet at the second position is given "2", and so on.

It is then determined, in step S22, whether or not there is an access by the host computer 11 for a predetermined time period from the immediately preceding access. If it is determined that there is no access by the host computer 11 for the predetermined time from the immediately preceding access, the routine proceeds to step S23. In step S23, the packet "no" (n=1) is reproduced.

Thereafter, it is determined in step S24, whether or not the packet "n" (n=1) is a blank area. If it is determined that the packet "n" (n=1) is a blank area, the routine proceeds to step S25. In step S25, predetermined data, that is, for example, data represented by "00h" is recorded in the packet "n" (n=1).

After the recording of the packet "n" (n=1) is completed, it is determined, in step S26, whether or not the number "n" is equal to the number of the last packet in the recorded area. If the number "n" is not equal to the number of the last packet in the recording area, the routine proceeds to step S27. In step S27, the number "n" is incremented, and the routine returns to step S22 so as to repeat the process of steps S22 to S26 until the packet number "n" becomes equal to the number of the last packet. When it is determined, in step S26, that the packet number "n" is equal to the number of the last packet, the routine is ended.

It should be noted that if it is determined, in step S22, that there is an access by the host computer 11 within the predetermined time from an immediately preceding access, the routine is ended. Additionally, if it is determined, in step S24, that the packet "n" is not a blank area, the routine proceeds to step S27 so as to increment the packet number "n" and returns to step S22.

According to the process shown in FIG. 8, blank packets contained in the recorded area of the CD-RW disk 1 are eliminated, the thus-recorded CD-RW disk 1 can be reproduced by a conventional CD-ROM drive.

However, if the above-mentioned blank area recording process is performed on all of the blank areas existing in the recording area of the CD-RW disk 1, a recording time increases as the amount of the blank areas increases. For example, if data is recorded only in an inner area of the recording area of the CD-RW disk 1 and the blank area recording process is performed on all of the blank areas in the recording area, the recording time is unnecessarily increased since the blank areas located on an outer area of the recording area are also subjected to the blank area recording process.

Additionally, it is unnecessary to record data in all of the blank areas contained in the recording area of the CD-RW disk 1 since a part of the recording area, which part is located beyond the last address area in which the UDF data is recorded, is not accessible by a regular operating system, such as Windows 95®.

Accordingly, a conventional CD-ROM drive does not access an area located beyond the last address, and thus, there is no reproducing error due to the blank area located beyond the last address. That is, there is no need to perform the blank area recording process on the blank area located beyond the last address area in which data necessary for the operating system is recorded.

Accordingly, in the CD-RW drive according to the present embodiment, in order to eliminate such an unnecessary recording time, the last address of the user data block 56 is stored in the buffer 8 so as to compare the address of the blank area to be subjected to the blank area recording process with the last address stored in the buffer 8.

Figure 9:
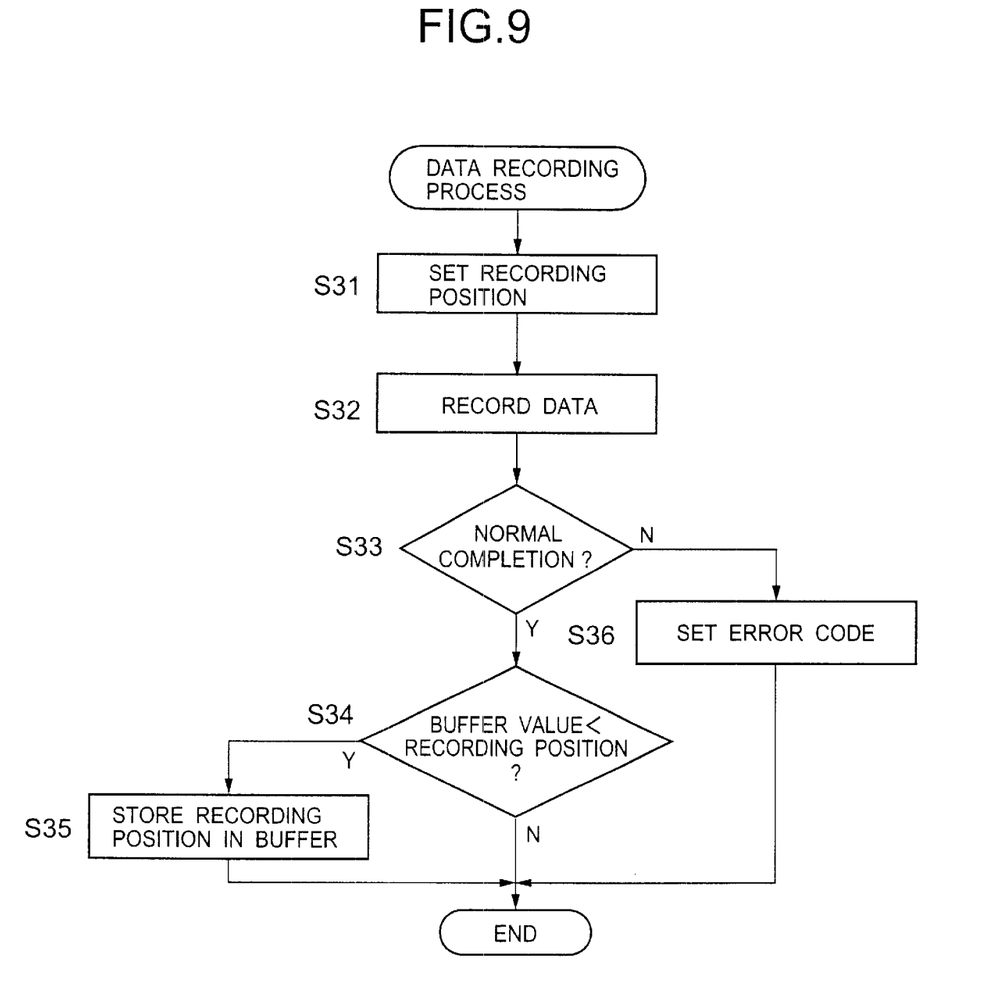
FIG. 9 is a flowchart of an operation for recording data on the CD-RW disk by the CD-RW drive shown in FIG. 1.

FIG. 9 is a flowchart of an operation for recording data on the CD-RW disk 1 by the CD-RW drive according to the present embodiment.

When the drive controller 7 receives a recording command from the host computer 11, the drive controller 7 sets, in step S31, a recording position on the CD-RW disk 1 from which a recording operation is started. Then, in step S32, data is recorded on the CD-RW disk 1.

Thereafter, it is determined, in step S33, whether or not the recording operation in the step S33 is completed normally. If it is determined that the recording operation is completed normally, the routine proceeds to step S34. Then, it is determined, in step S34, whether or not the value stored in the buffer 8 is smaller than the recording position set in step S31. It should be noted that the value is stored in the buffer when a regular recording is performed on the CD-RW disk 1. If it is determined that the value stored in the buffer 8 is not smaller than the recording position, the routine is ended. On the other hand, if it is determined that the value stored in the buffer is smaller than the recording portion, the routine proceeds to step S35. In step S35, the value stored in the buffer 8 is replaced by the recording position, and the routine is ended.

If it is determined, in step S33, that the recording operation is not completed normally due to an error, the routine proceeds to step S36. In step S36, an error code is set, and the routine is ended.

Figure 10:
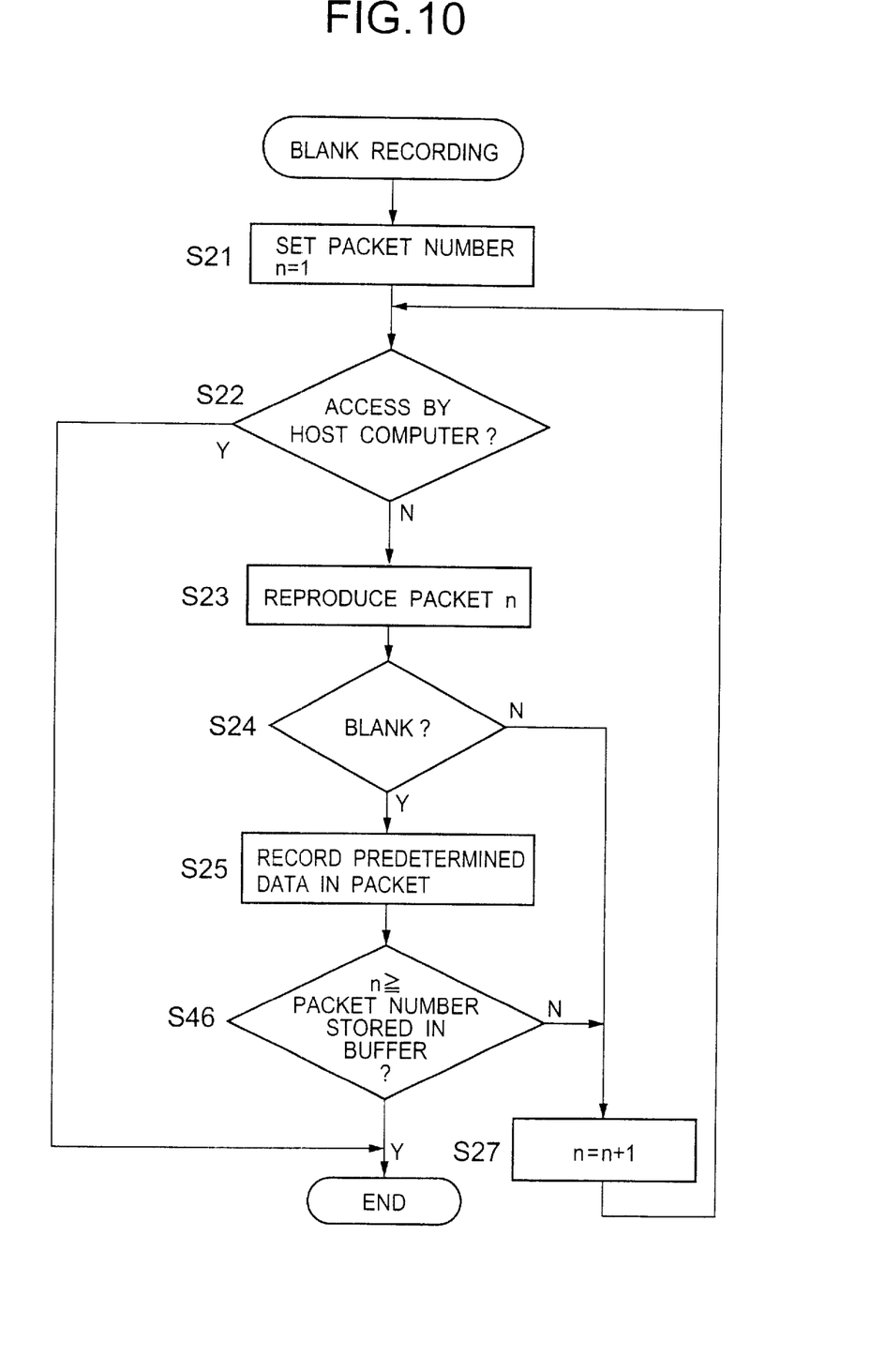
FIG. 10 is a flowchart of another blank recording process for recording data in a blank area of the CD-RW disk by the CD-RW drive shown in FIG. 1.

FIG. 10 is a flowchart of another blank recording process for recording data in a blank area of the CD-RW disk 1 by the CD-RW drive shown in FIG. 1. In FIG. 10, steps that are the same as the steps shown in FIG. 8 are given the same step number, and descriptions thereof will be omitted.

The blank recording process shown in FIG. 10 is the same as the blank recording process shown in FIG. 8 except for the step S26 being replaced by the step S46. That is, in the blank recording process shown in FIG. 10, after the predetermined data is recorded in the packet "n" in step S25, the routine proceeds to step S46. It is then determined, in step S46, whether or not the packet number "n" is equal to or greater than a value stored in the buffer 8. If it is determined, in step S46, that the packet number "n" is smaller than the value stored in the buffer 8, the routine proceeds to step S27. In step S27, the packet number is incremented, and the routine returns to step S22. On the other hand, if it is determined, in step S46, that the packet number "n" is equal to or greater than the value stored in the buffer 8, the routine is ended.

As mentioned above, according to the blank recording process shown in FIG. 10, the predetermined data is recorded only in the blank areas which area located on the inner side of the last recording address in the recording area. Thus, the blank recording process is applied only to the blank packets which should be subjected to the blank recording process. This reduces a time spent on the blank recording process.

In the above-mentioned embodiment, the easy formatting process and the blank recording process are described in relation to the CD-RW drive. However, the present invention may be applied to other information recording and reproducing apparatuses that use a rewritable recording medium which needs an initial formatting.

The present invention is not limited to the specifically disclosed embodiments, and variations and modifications may be made without departing from the scope of the present invention.

The present application is based on Japanese priority applications No.10-250146 filed on Sep. 3, 1998 and No.10-315049 filed on Nov. 5, 1998, the entire contents of which are hereby incorporated by reference.

What is claimed is:

1. An information recording and reproducing apparatus using a rewritable recording medium having a user data area, a track divided into a plurality of packets is defined in the user data area by being subjected to an initial formatting process before use so that data is recorded in the user data area on an individual packet basis, said information recording and reproducing apparatus comprising:

easy formatting means for formatting a blank rewritable recording medium without defining the packets in the user data area so that only information regarding the track is recorded on the recording medium in accordance with the initial formatting process;

position reading means for reading time information previously recorded on the user data area of the unformatted blank rewritable recording medium, the time information representing position information in the user data area; and recording means for recording data in the user area on an individual packet basis, the recording being performed in accordance with the information regarding the track recorded on the rewritable recording medium that has been formatted by the easy formatting means and the position information obtained by the position reading means, the recording means further recording information necessary for carrying out recording after the easy formatting means has completed formatting the blank rewritable recording medium.

2. The information recording and reproducing apparatus as claimed in claim 1, wherein the recording means includes a blank packet recording means for recording predetermined data in a blank packet contained in the user data area when said information recording and reproducing apparatus does not perform a normal recording or reproducing operation on the rewritable recording medium.

3. The information recording and reproducing apparatus as claimed in claim 2, further comprising a buffer storing an address of a last packet in which data is recorded, and wherein said blank packet recording means records the predetermined data in only a blank packet located on an inner side of the rewritable recording medium with respect to the address stored in the buffer.

4. The information recording and reproducing apparatus as claimed in claim 1, wherein said rewritable recording medium is a CD-RW disk, and said easy formatting means formats only a lead-in area, a program memory area and a pre-gap area of the CD-RW disk.

5. A method of recording a rewritable recording medium having a user data area, a track containing a plurality of packets is defined in the user data area by being subjected to an initial formatting process before use so that data is recorded in the user data area on an individual packet basis, said method comprising the steps of:

formatting a blank, rewritable recording medium without formatting the user data area so that only information regarding the track is recorded on the recording medium in accordance with the initial formatting process;

reading time information previously recorded on the user data area of the unformatted blank, rewritable recording medium, the time information representing position information in the user data area;

recording data in the user data area on an individual packet basis by referring to the time information; and after the initial formatting process, recording predetermined information necessary for carrying out the recording of data in a blank packet contained in the user data area.

* * * * *